United States Patent [19]

Miller

[11] 4,299,255
[45] Nov. 10, 1981

[54] EMERGENCY PIPELINE SHUT-OFF APPARATUS

[76] Inventor: John H. Miller, 402 N. 10th St., Manitowic, Wis. 54220

[21] Appl. No.: 30,311

[22] Filed: Apr. 16, 1979

[51] Int. Cl.³ .................. F16L 55/10; B23B 41/08
[52] U.S. Cl. .................................. 138/89; 138/94; 137/15; 137/318
[58] Field of Search .............. 138/89, 93, 94; 137/15, 137/318

[56] References Cited

U.S. PATENT DOCUMENTS

| 2,588,188 | 3/1952 | Weisman | 138/94 X |
| 3,091,260 | 5/1963 | Milanovits et al. | 138/94 |
| 3,685,544 | 8/1972 | Ball et al. | 138/89 X |
| 3,948,282 | 4/1976 | Yano | 138/89 X |
| 4,019,541 | 4/1977 | Koppl | 138/89 X |

Primary Examiner—James E. Bryant, III
Attorney, Agent, or Firm—Alter and Weiss

[57] ABSTRACT

An emergency pipeline shut-off apparatus for interpositioning within a fluid transmitting pipe circuit in which a resilient plug stopper is capable of alternative placement between an open and closed position to allow or block passage of the fluid respectively. Remote stopper activation elements cooperate with control members and locking features to position the stopper in the desired open or closed configuration followed by the automatic locking of the stopper in that particular position. The remote stopper control device can be expressly reactivated to be withdrawn from its locked position.

9 Claims, 13 Drawing Figures

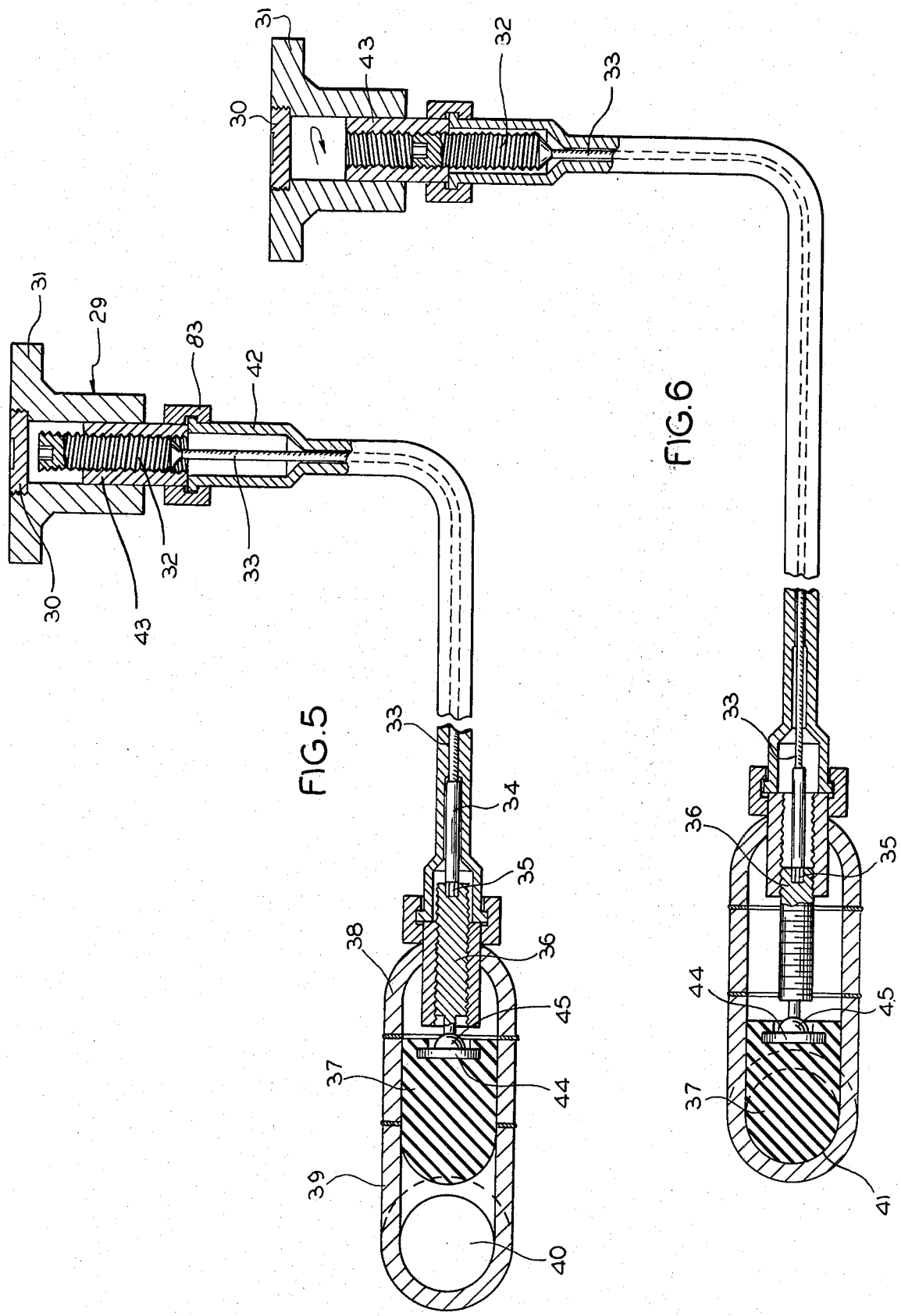

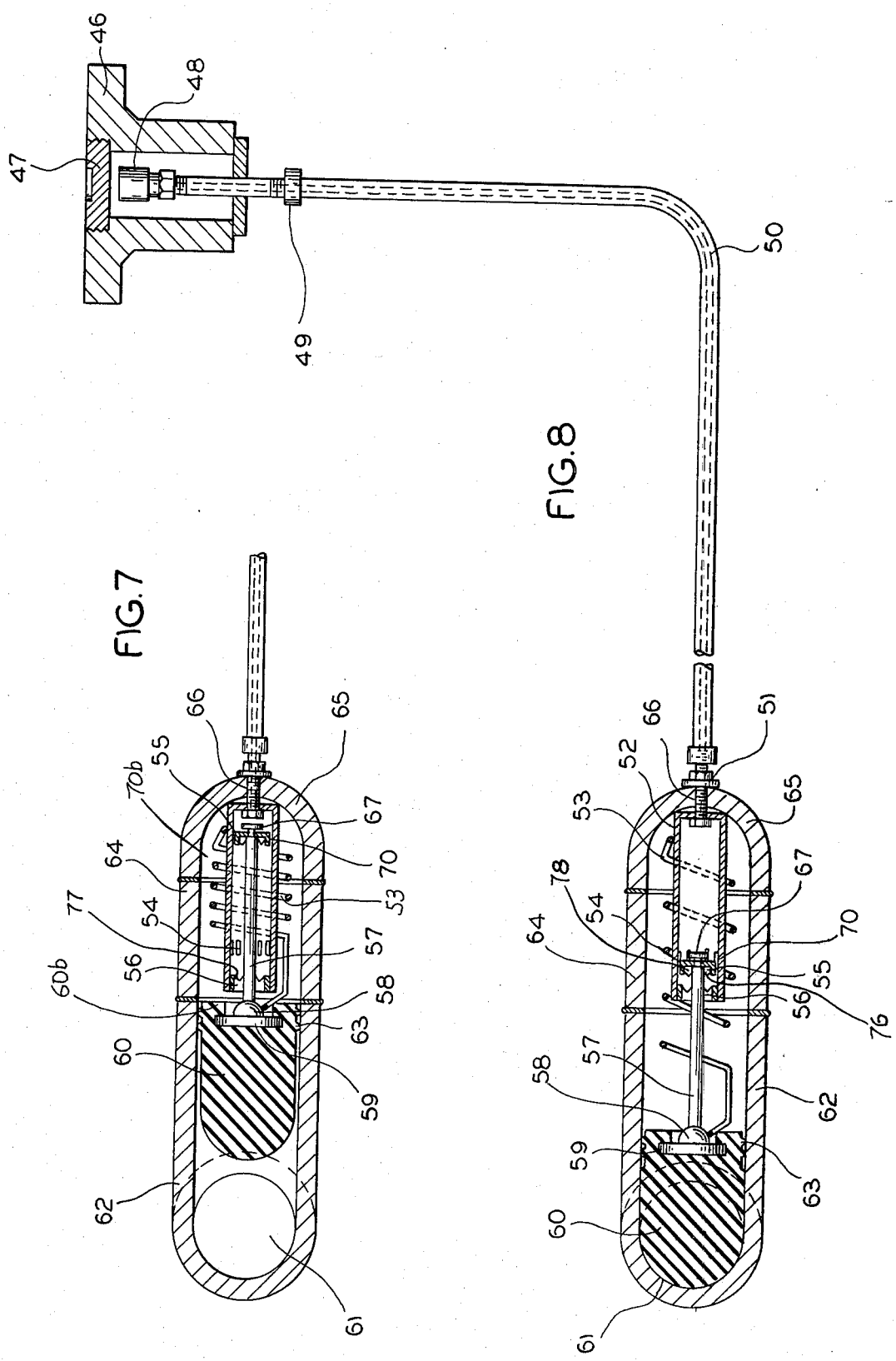

EMERGENCY PIPELINE SHUT-OFF APPARATUS

BACKGROUND OF THE INVENTION

The present invention relates in general to fluid control devices or valves and particularly to an emergency pipeline shut-off apparatus for interposition within a fluid transmitting pipe circuit.

While there exist many types of valves for utilization in the "in-circuit" interruption of fluid passage, many if not most of these valves are incapable of adaptation to remote control operation. Additionally, of those valves that are operated by remote control or are capable of operation by remote control, many of these fail to utilize automatic locking features which preclude the inadvertent release of the fluid stoppage device from its closed position.

The present invention has as one of its objects, a shut-off stopper for utilization in fluid circuit emergency situations, which is capable of activation by remote control devices.

It is further an object of the present invention to provide such a pipeline shut-off stopper which can be easily and efficiently incorporated into a circuit at virtually any desired position along the circuit, and one which is further economical to manufacture.

It is further the object of the present invention to provide such a shut-off apparatus which incorporates a "lock out" feature to preclude the inadvertent release of the stopper from its extended fluid interruption position.

These and other objects of the invention will become apparent in light of the present specification.

SUMMARY OF THE INVENTION

The present invention is an emergency pipeline shut-off apparatus interposition within a fluid transmitting pipe circuit. The apparatus comprises housing means which can be positioned into the pipe circuit and attached to it, as well as resilient plug stopper means capable of being operated between an alternative open position wherein it is retracted and a closed position wherein it is extended to interrupt the passage of the fluid passing through the circuit. Stopper control means are operatively attached to the rear side of the plug stopper means and positioned within the housing for controlling the retraction and extension of the stopper. Remote stopper activation means are attached to the control means and operatively activate the control means to in turn control the stopper from a position remote to the apparatus housing means. Additionally, stopper locking means are utilized for automatically and fixedly restraining the plug stopper after positioning the plug stopper into its extended-closed position, to preclude inadvertent retraction of the plug stopper itself.

In the preferred embodiment of the invention, the housing for the apparatus comprises a T-shaped housing having substantially aligned legs on opposite sides of the main stem portion, the legs of which are capable of alignment and attachment with the exposed ends of the circuit into which the shut-off apparatus is being interposed. When being joined into a metallic circuit, the apparatus housing would be equivalently formed of a metallic material to be capable of secure, fixed and leak-proof attachments to the exposed ends of the circuit through welding. If the fluid circuit is formed of a plastic material, the housing could also be of a plastic material and be capable of equivalent fixed, leak-proof, attachment to the exposed end of the circuit through heat sealing techniques.

The resilient plug stopper comprises a substantially cylindrically shaped stopper of a rubber material. The cylindrically shaped stopper has a substantially spherical shape at one end, the end that is interposed into the circuit to shut-off fluid flow. A substantially flattened shape occurs at the second end of the stopper where the stopper is connected to the stopper control means. As stated, the spherically shaped portion at the first end is capable of direction between its extended and withdrawn positions within the housing so as to itself be directly positionable in and out of the fluid path circuit to provide an effectively sealed open or closed apparatus position.

In one embodiment of the invention the remote stopper activation means comprises a rotatable cable activation assembly. This rotatable cable activation means comprises a cable in a cable housing as well as a means for imparting rotation to the cable, and means for attaching the end of the cable to the stopper control means in the housing. As rotation is imparted to the cable, rotation will also be imparted to the control means to which the cable is attached to in turn alternatively extend or withdraw the plug stopper which is subsequently attached to the control means.

The means for imparting rotation to the cable itself comprises attachment of the remote or furthest end of the cable to a first threaded stem which is engaged in a first threaded bushing. This first threaded stem rotates within the first bushing to in turn rotate the cable and alternatively extend or withdraw the remote end of the cable as the stem is turned in a clockwise or counter-clockwise direction. This rotating cable in turn rotates the control means in an equivalent fashion to extend or withdraw in position, relative to the inside of the apparatus housing.

In this particular embodiment the control means itself comprises a second stem threadedly received within a second threaded bushing within the apparatus housing. This second stem of the control means is rigidly connected at one end of the cable and at a second end, opposite the first end, to the stopper plug means. The connection of the second threaded stem at the second end, that is to the stopper plug, is such that slippage is allowed therebetween so as to avoid rotating the plug stopper itself, as the stem rotates while simultaneously extending or withdrawing in position within the housing.

In another embodiment of the invention, the remote stopper activation means comprises a fluid energizing means such as a hydraulic or pneumatic type of energizing system. The energizing means comprises a fluid circuit operably connected to the stopper control means as well as a fluid substance capable of being directed under pressure to extend said control means to its forward position. The fluid pressure can also be reduced to permit withdrawal of the stopper control means through biasing means associated with such control means.

In the preferred version of this embodiment the stopper control means comprises a fluid operation cylinder with stem means longitudinally interposed within it. The stem means is operably connected to the plied. Biasing means are used to keep the piston, stem and stopper in a withdrawn, open, position in the absence of sufficient pressurized fluid and in this particular embodiment, such biasing means comprising a compressive spring interposed between the cylinder and the plug stopper.

In this preferred version of the second embodiment, that in which hydraulic or pneumatic means are used to remotely operate the apparatus, the control means stem is connected at its second end to the stopper plug means to equivalently allow slippage therebetween, as in the mechanical version of the invention, to preclude rotation of the stopper in response to any rotation of the stem.

Each of the two primary embodiments of the invention preferably rely upon stopper locking means to lock the stopper into its extended closed position. In the pneumatic embodiment, said stopper locking means comprises a series of stationary guide columns with which a guide cam and locking cam cylinder cooperate. The locking cam cylinder is capable of rotation within the guide cam in response to the successive application of pneumatic force. Locking stops are positioned between every other pair of stationary guides to alternatively restrain or release locking cams on the locking cam cylinder upon said applications of force. Guide cam teeth act to rotate the locking cam cylinder and the positions of the locking cams themselves alternatively into and out of communication with the respective locking stops when the locking cam returns after force application, through spring biasing. The rotation results from cooperation between the angled top surface of the cams with the angled bottom surface of the guide cam teeth to effectuate rotation in a single rotational direction. The guide cams on the guide cam cylinders maintain the guide cam cylinder from rotating through securement between respective stationary guides.

Thus, in this embodiment automatic release means are utilized for releasing the stem from its locked position in which the stopper is extended. Such release occurs in response to a second or successive application of fluid pressure from the remote stopper activation means.

In the mechanical embodiment the stopper locking means comprises the threaded locking receipt of the second threaded stem within the second threaded bushing.

BRIEF DESCRIPTION OF THE DRAWINGS

FIG. 5 of the drawings is a side elevational view of the apparatus with the stopper means in its open-withdrawn position showing particularly, the remote stopper activation means as comprising a rotatable cable assembly;

FIG. 6 of the drawings is a view of the apparatus as shown in FIG. 5 in which the stopper means has been directed to its closed-extended position;

FIG. 7 of the drawings is a cross-sectional side view showing the embodiment of the apparatus in which the stopper control means comprises a pneumatically or hydraulically powered control device;

FIG. 8 of the drawings is an equivalent side view as FIG. 7 in which stopper means is in its closed-extended position, and which shows the pneumatic remote stopper activation means associated therewith;

DETAILED DESCRIPTION OF THE DRAWINGS

Figure 1:
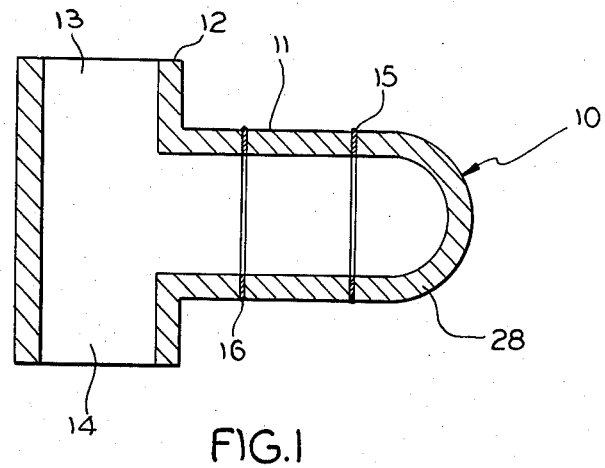
FIG. 1 of the drawings is a top cross-sectional view of the shut-off apparatus housing.

While this invention is susceptible in embodiment in many different forms, there is shown in the drawings and will herein be described in detail, several specific embodiments with the understanding that the present disclosure should be considered as an exemplification of the principles of the invention and is not intended to limit the invention to the embodiments illustrated.

Apparatus housing 10 as shown in FIG. 1 comprises T-fitting 12 integrated with pipe portion 11 and cup portion 28. T-fitting 12 is attached to pipe portion 11 through weld 16, which if metal material is used, would comprise a standard metal weld or, in the case of thermoplastics, would comprise a heat sealed weld. Equivalently, pipe portion 11 is in turn attached to cup portion 28 through weld 15 therebetween. Passages 13 and 14 are described by T-fitting 12 for alignment with the exposed ends of the fluid conducting circuit.

Figure 2:
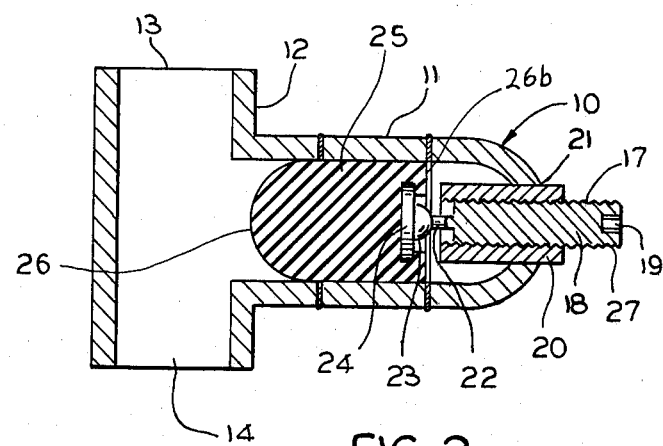
FIG. 2 of the drawings is an equivalent view of the housing in cross-section showing positioning of the stopper means in its open-withdrawn position.

The apparatus is shown in FIG. 2 in a comparable view to that of FIG. 1, wherein passages 13 and 14 are also shown as are T-fitting 12, pipe portion 11 and cup portion 28 all making up apparatus housing 10. Additionally, shown in FIG. 2, are the stopper control means as well as the stopper itself 25 positioned within housing 10 after aperture 21 has been created in cup portion 28. Stopper 25 has spherical end 26 and at its opposite flat end 266 is attached to attachment plate 24 and swivel ball 23. Attachment stem 22 directly attaches second threaded stem 18 positioned in second threaded bushing 20 to swivel ball 23. Attachment stem 22 directly attaches second threaded stem 18 positioned in second threaded bushing 20 to swivel elements 23 and 24 which eliminate rotation between rotatable stem 18 and stopper 25. Faceted aperture 19 is provided in second threaded stem 18 to enable the receipt of the rotatable cable activation means. FIG. 2 of the device shows the stopper and the stopper control means in their withdrawn-open position whereby fluid passing through the circuit would be allowed to pass freely between passages 13 and 14 for example.

Figure 3:
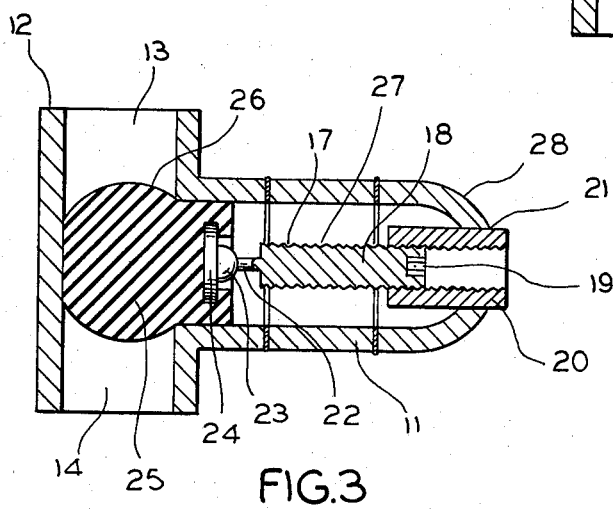
FIG. 3 of the drawings is a top cross-sectional view of the apparatus showing the stopper means in its closed, extended position.
Figure 4:
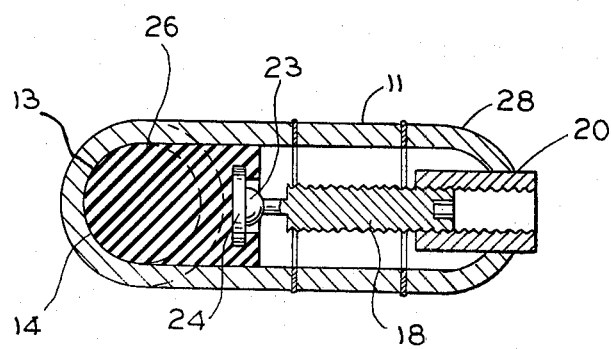
FIG. 4 of the drawings is a side view of the apparatus in cross-section showing the stopper means in its closed-extended position.

In FIG. 3, however, the stopper and the stopper control means are shown in their closed-extended position so as to block the space between passages 13 and 14 to in turn close off the actual flow of fluid within the circuit. Because of the spherical shape of the foremost end of stopper 25, a substantially bulbous shape is acquired by the stopper in its extended position. Due to the threaded receipt of the threads 17 on stem 18 within bushing 20, stem 18 is capable of moving the stopper into its extended position upon rotation of the stem within bushing 20. As previously mentioned, while stem 18 is capable of rotation within bushing 20, such rotation will not be imparted through attachment stem 22 to stopper 25, due to the swivelling structure of swivel ball 23 and attachment plate 24. A side view of the device having its stopper in its extended-closed position is shown in FIG. 4 wherein the outline of passage 13 can be seen, as can be the shape of the stopper as it fills the fluid passage circuit portion within housing 10.

The apparatus of the mechanical cable embodiment, is shown in FIG. 5 in which the remote activation means 29 are illustrated. First threaded stem 32 is threadedly received by first threaded bushing 43, enclosed within remote casing 31 having removable plug 30 permitting the insertion of a crank, for example, for rotating stem 32 in either a clockwise or counterclockwise direction. The rotation of stem 32 in turn rotates cable 33 within its second bushing. As can be seen, the rotation of first stem 32 will rise or lower its position within first bushing 43 to in turn lower or raise the position of the cable and serve to withdraw or extend the position of second stem 36 within its threaded bushing. Such extension or withdrawal of stem 36 in turn extends or withdraws the position of stopper 37 within housing portions 39, to close off the circuit fluid through passage 40 and out the opposite leg of the T-shaped housing.

FIG. 6 shows the position of first threaded stem 32 after it has been rotated within bushing 43 in a clockwise fashion (from above), so as to push down the position of cable 33 and to extend the position of second stem 36 to, in turn, position stopper 37 into a closed position where sealing of the circuit is obtained along interface 41. As previously described, swivel allowance means such as swivel ball 45 and attachment plate 44 enables the rotation of stem 36 in and extended or withdrawn position without rotating the stopper 37 itself.

Another embodiment of the pipeline shut off apparatus is shown in FIGS. 7 and 8 in which the stopper control means are actuated through fluid pressure energizing means. Pneumatic or hydraulic power may be alternatively utilized in the embodiment illustrated by these figures.

FIG. 7 particularly shows the apparatus in its withdrawn-open position whereby fluid passing through channel 61 is uninterrupted. Stopper 60 is connected at its flat end 60b to the stopper control means by plate 59 and swivel mechanism 58. Sealing flares 63 are fabricated into the periphery of stopper 60 proximate to flat end 60b, to effectuate a seal between the stopper itself and housing 64. When pneumatic or hydraulic fluid pressure is applied through line 50 and in turn through channel 66 enetering cylinder 70, it fills both cylinder 70 and chamber 70b so as to contact and apply pressure against piston 55 and end 60b of stopper 60. Accordingly, both stopper 60 and stem 57 operably connected thereto, advance towards the closed position wherein stopper 60 interrupts the passage of fluid through channel 61. Biasing spring 53 is interposed between one end of cylinder 70 and the flat end 60b of stopper 60. This biasing spring 53 maintains stopper 60, stem 57 and piston 67 in their withdrawn-open position until fluid pressure is sufficiently conducted through line 50 into cylinder 70 and chamber 70b. Stopper 60 is shown in its closed position blocking off channel 61 in FIG. 8 wherein biasing spring 53 is placed under tension.

The locking and locking release features of the embodiment of the invention shown in FIGS. 7 and 8 are disclosed in detail in FIGS. 9 through 13.

Figure 9:
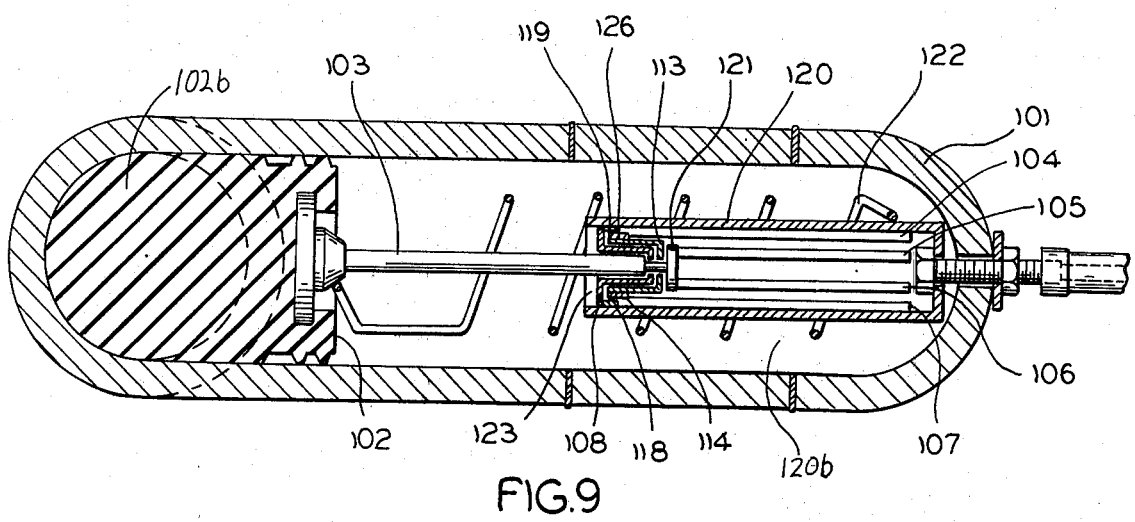
FIG. 9 of the drawings is an enlarged cross-sectional view showing with particularity Applicant's stopper control and release features in the pneumatic-hydraulic embodiment.

In FIG. 9 the pipe line shut off apparatus is shown in its closed, fluid interrupting position wherein stopper 102b is blocking the fluid conduction path. Several elements, namely stationary guides 104 through 107, guide cam cylinder 113 with teeth 117 and 138, locking cam cylinder 108 with locking cams 109-112, locking stops 118 and 119 as well as guide cams 114 and 126 on guide cam cylinder 113, cooperate to alternatively lock and release stem 103 and in turn stopper 102b from its closed position, upon successive applications of hydraulic or pneumatic force.

Figure 10:
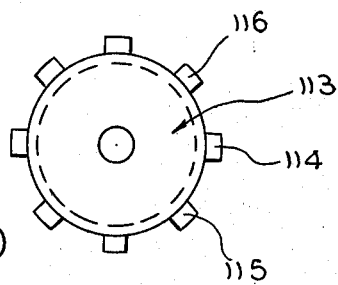
FIG. 10 of the drawings is a top view of the guide cam cylinder.
Figure 11:
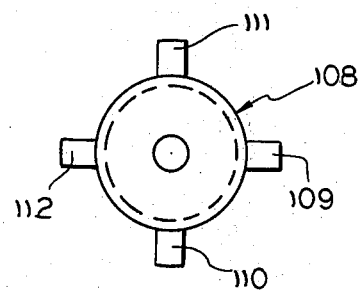
FIG. 11 is a top view of the locking cam cylinder.
Figure 12:
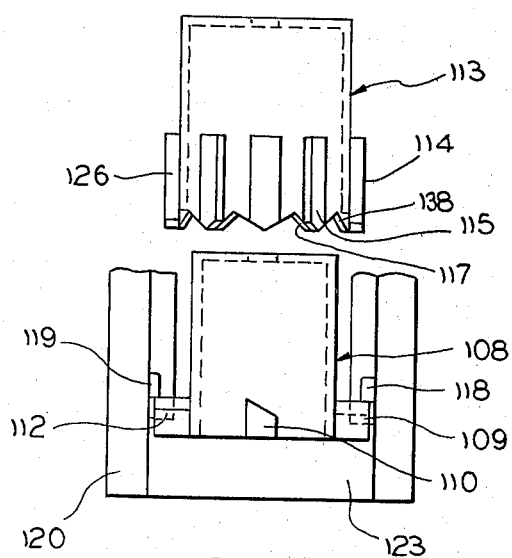
FIG. 12 is an exploded elevational view of the guide cam cylinder, locking cam cylinder and fluid operation cylinder arrangement.
Figure 13:
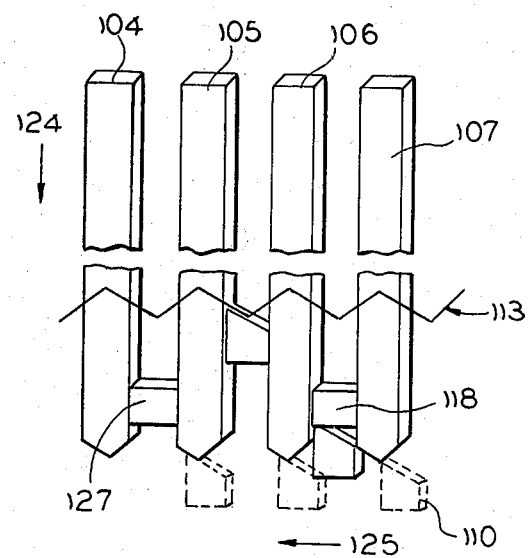
FIG. 13 is a schenatic drawing illustrating the cooperation between the guide cam cylinder and locking cam cylinder to achieve rotation.

Particularly, guide cam cylinder 113 is shown in FIGS. 10 and 12 while locking cam cylinder 108 is shown in FIGS. 11 and 12. Guide cam cylinder 113 has guide cams such as cams 114 and 115. Locking cam cylinder 108, as shown in FIG. 11 has locking cams 109 through 112. As shown in FIG. 12, as well as FIG. 9, locking cam cylinder 108 is telescopically received within guide cam cylinder 113 whereby locking cam cylinder 108 is capable of rotation within guide cam cylinder 113 while said guide cam cylinder is restrained against rotation through the location of guide cams such as cams 114 and 115 in the passages described by stationary guides 104 through 107. It should be realized that both the guide cam cylinder 113 and locking cam cylinder 108 are both capable of reciprocating movement between the ends of cylinder 120 as stem 103 and stopper 102b collectively reciprocate between their open and closed positions.

In operation, when fluid pressure is applied under force into cylinder 120 and chamber 120b, stem 103 and piston 121, having the guide cam cylinder and locking cam cylinder interposed therebetween, draw these two cylinders into position proximate to locking stops 118 and 119. Due to the previous positions of the locking cams 109, 110, 111, and 112 before pressure was applied, application of the force in direction 124 guide cam teeth on guide cam cylinder 113 into position with the sloped tops of the locking cams such as locking cam 110 in FIG. 13 to impart rotation in direction 125 to the locking cam cylinder 108. Upon release of this applied pressure, locking cam 110 locks in place behind lock stop 118. Upon a successive application of fluid pressure, the guide cam teeth on guide cam cylinder 113 rotates locking cam cylinder 108 an equivalent interval to reposition locking cam 110, for example, between stationary guides 105 and 106 at which position there is no lock stop so as to make capable the entire retraction of the overall locking assembly under spring bias, back to its original position where stem 103 and stop 102b are withdrawn.

Through such a procedure, the remote application of a first quantity of fluid pressure locks the shut off apparatus into its closed position while a successive application of fluid power releases the locking cam from its closed position behind a lock stop to make capable the unimpeded flow of fluid through the channel portion of the valve.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. An emergency pipeline shut-off apparatus for interposition within a fluid transmitting pipe circuit said apparatus comprising:
   apparatus housing means capable of being positioned into said pipe circuit and for attachment therewith;
   resilient plug stopper means capable of being alternatively operated between a retracted-open position and an extended-closed position to interrupt the passage of said fluid;
   stopper control means operatively attached to a rear side of said plug stopper means and positioned within said housing for controlling the alternative retraction and extension of said stopper;
   remote stopper activation means attached to and operatively activating said control means to in turn control said stopper means from a position remote to said apparatus housing means,
   said remote stopper activation means comprising rotatable cable activation means,
   said rotatable cable activation means comprising a cable in a cable housing with a proximate and a remote end, and means for imparting rotation to said cable, as well as means for attaching the proximate end of said cable to said stopper control means in said apparatus housing,
   said rotation imparted to said cable rotating said control means to in turn alternatively extend or withdraw said plug stopper means; and
   stopper locking means for automatically and fixedly restraining said plug stopper means after positioning into said extended-closed position thereby precluding inadvertent retraction of said plug stopper means.

2. The apparatus according to claim 1 in which said means for imparting rotation to said cable comprises a first threaded stem to which the remote end of said cable is attached,
   a first threaded bushing into which said first threaded stem is threadedly engaged,
   said first threaded stem rotating within said first bushing to rotate said cable and alternatively extend or withdraw the remote end of said cable as said stem is turned in a clockwise or counterclockwise direction,
   said cable, in turn, rotating said control means in an equivalent fashion to extend or withdraw its position relative to said apparatus housing.

3. The apparatus according to claim 1 in which said stopper control means comprises a second stem and a second threaded bushing within said apparatus housing,
   said second stem threadedly received within said second threaded bushing,
   said second stem of the control means rigidly connected at said remote end to said cable and at said proximate end to said stopper plug means,
   said connection of said second threaded stem at said proximate end to said stopper plug means allowing slippage therebetween thereby avoiding rotation of said plug stopper means as said stem rotates in an extended or withdrawn position to, in turn, alternatively extend or withdraw said stopper means without rotating same.

4. The invention according to claim 3 which said stopper locking means comprises the threaded locking receipt of said second threaded stem within said second threaded bushing.

5. The invention according to claim 4 wherein said locking release means comprises arrangement of said first and second stems in said first and second threaded bushings whereby reverse rotation retracts said second stem and bushing and in turn said stopper from said closed position.

6. An emergency pipeline shut-off apparatus for interposition within a fluid transmitting pipe circuit said apparatus comprising:
   apparatus housing means capable of being positioned into said pipe circuit and for attachment therewith;
   resilient plug stopper means capable of being alternatively operated between a retracted-open position and an extended-closed position to interrupt the passage of said fluid;
   stopper control means operatively attached to a rear side of said plug stopper means and positioned within said housing for controlling the alternative retraction and extension of said stopper;
   remote stopper activation means attached to and operatively activating said control means to in turn control said stopper means from a position remote to said apparatus housing means;
   said remote stopper activation means comprising fluid energizing means,
   said energizing means comprising a fluid circuit operably connected to said stopper control means;
   a fluid substance capable of being directed under pressure to extend said control means and said stopper in a forward position;
   said fluid substance pressure being reducible to permit withdrawal of said stopper control means;
   biasing means for overcoming said reduced fluid substance pressure to withdraw said stopper control means; and
   stopper locking means for automatically and fixedly restraining said plug stopper means after positioning into said extended-closed position thereby precluding inadvertent retraction of said plug stopper means.

7. The invention according to claim 6 in which said stopper control means comprises,
   a fluid operation cylinder;
   stem means longitudinally interpose within said cylinder,
   said stem means being operably connected to said stopper means at a second end opposite to first end,
   said stem means having piston means at a first end with which said fluid under pressure cooperates to extend said stem and said stopper,
   said biasing means for keeping said piston, stem and stopper means in a withdrawn position in the absence of said pressurized fluid comprising compressive spring means interposed between said cylinder and said plug stopper means.

8. The apparatus according to claim 7 in which said connection of said control means stem at said second end of said stem to said stopper plug means includes means to allow slippage therebetween thereby precluding rotation of said stopper means in response to any rotation of said stem.

9. The apparatus according to claim 8 in which said stopper locking means comprises:
   a plurality of stationary guides within said operation cylinder;
   a guide cam cylinder positioned for reciprocating movement within said operation cylinder between said stem and and said piston;

said guide cam cylinder having a plurality of guide cams about its periphery respectively positioned between said stationary guides to preclude the impartation of rotation to said guide cam cylinder;

a plurality of lock stops positioned at one end of said operation cylinder between alternating ones of said stationary guides;

locking cam cylinder means operably disposed between said guide cam cylinder and said stem for rotatable movement therebetween;

said locking cam cylinder means having a plurality of locking cams which cooperate with a plurality of guide cam teeth on said guide cam to impart rotational movement to said locking cam cylinder of pre-set interval when said guide cam teeth are forcibly brought into contact with said respective locking cams;

said locking cams alternatively being positioned under said respective lock stops and being removed from position under said lock stops upon successive application of force between said guide cam cylinder and said locking cam cylinder thereby locking said stem and stopper into its extended position upon a first application of fluid pressure followed by the release of said stem and stopper from said extended position upon a successive fluid pressure application whereby said stem, piston guide cam cylinder and locking cam cylinder are withdrawn in said operation cylinder to said open withdrawn position by said biasing spring.

* * * * *

UNITED STATES PATENT AND TRADEMARK OFFICE
CERTIFICATE OF CORRECTION

PATENT NO. : 4,299,255
DATED : November 10, 1981
INVENTOR(S) : John H. Miller

It is certified that error appears in the above-identified patent and that said Letters Patent are hereby corrected as shown below:

Column 2, line 64: After "to the" and before "plied" insert:
-- stopper at a second end opposite the first end. At this first end the stem means has a piston which, with the flat end of the stopper, cooperates with the fluid pressure to extend the stem and in turn the stopper when the fluid pressure is ap --;

Column 5, line 20: "rise" should be -- raise --;

Signed and Sealed this

Twentieth Day of April 1982

|SEAL|

Attest:

GERALD J. MOSSINGHOFF

Attesting Officer     Commissioner of Patents and Trademarks